May 28, 1968     F. C. PRUVOT ET AL     3,385,057
HYDRAULIC CONTROLLER
Filed Aug. 25, 1964     5 Sheets-Sheet 1
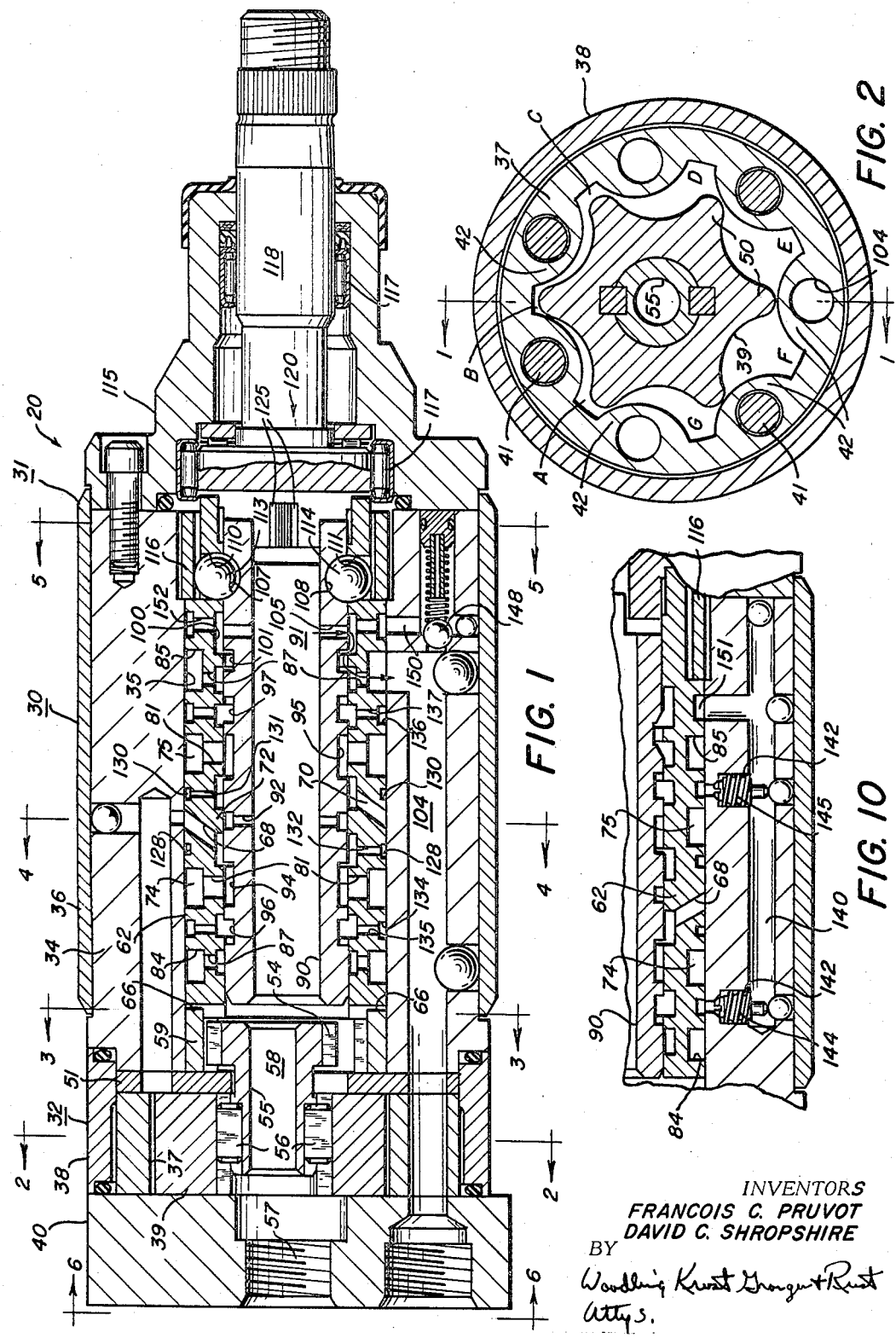
INVENTORS
FRANCOIS C. PRUVOT
DAVID C. SHROPSHIRE
BY Woodling, Krost, Granger+Rust
attys.

May 28, 1968

F. C. PRUVOT ET AL 3,385,057

HYDRAULIC CONTROLLER

Filed Aug. 25, 1964

INVENTORS
FRANCOIS C. PRUVOT
DAVID C. SHROPSHIRE
BY Woodling, Krost, Granger + Rust
attys.

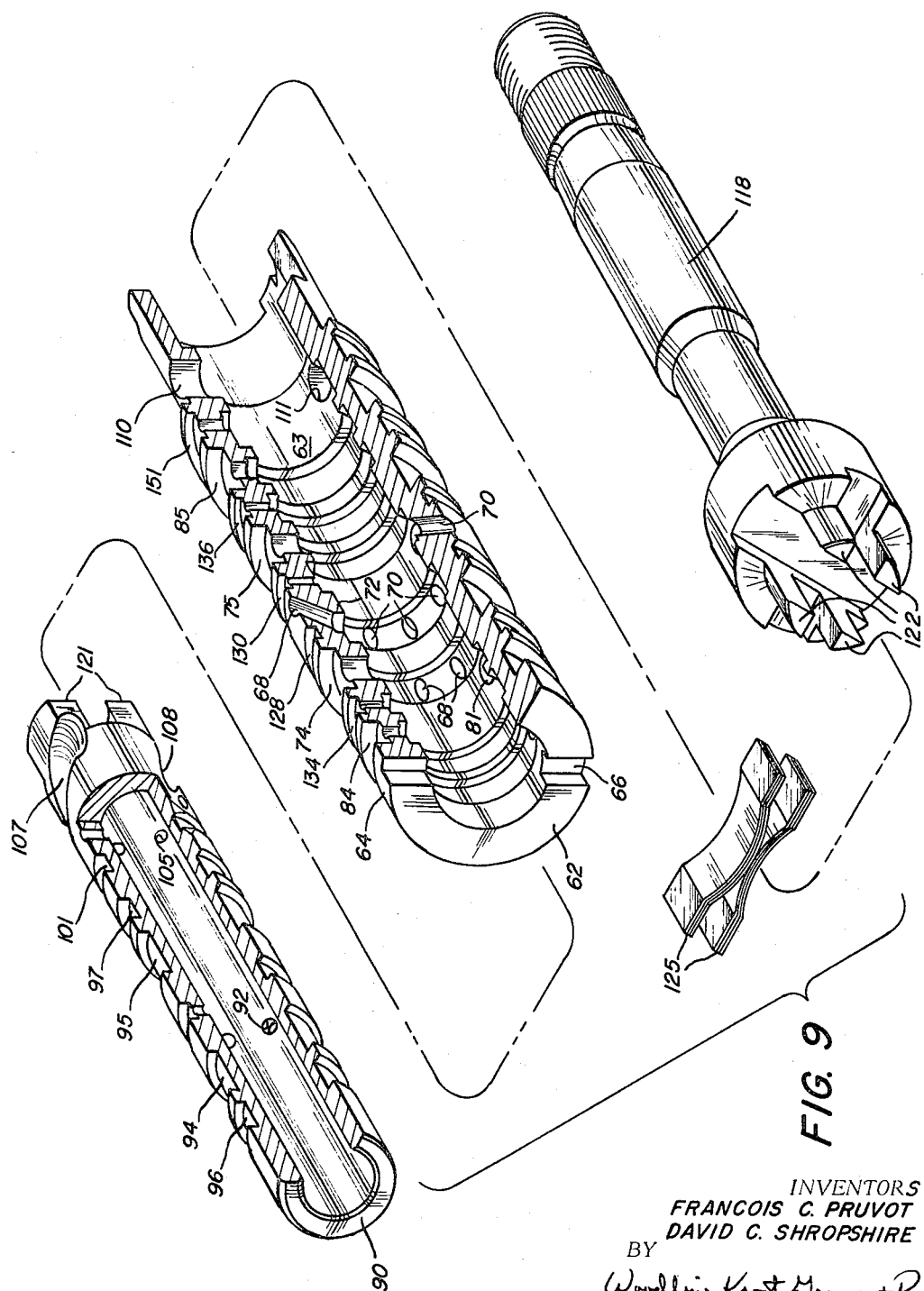

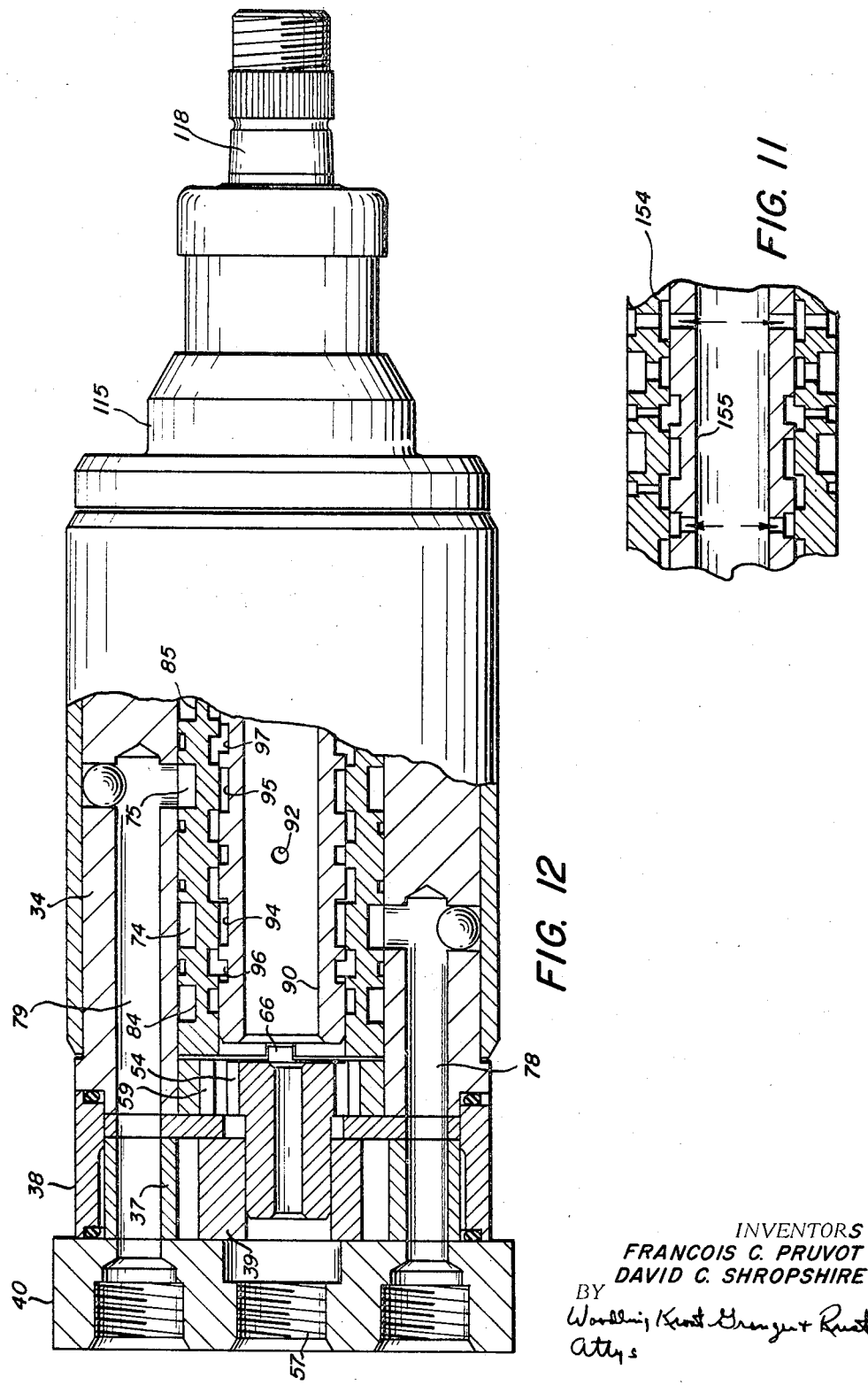

`United States Patent Office`

3,385,057
Patented May 28, 1968

3,385,057
HYDRAULIC CONTROLLER
Francois C. Pruvot and David C. Shropshire, Lafayette, Ind., assignors to TRW Inc., a corporation of Ohio
Filed Aug. 25, 1964, Ser. No. 392,055
34 Claims. (Cl. 60—52)

The present invention relates in general to a fluid controller and more particularly to such a device which is particularly adapted to control hydraulic fluid flow in a power steering system.

An object of the present invention is to provide a new and unique controller which upon a given signal supplies pressurized fluid to perform a given function and upon the function being performed the controller shuts off the supply of pressurized fluid.

Another object of the present invention is to provide a controller which operates by means of the rotation of an operating shaft to cause axial movement of a valve and thereby porting of hydraulic fluid to a hydraulic power device and functioning of the power device causing axial return of the valve.

Another object of the present invention is to provide a controller which includes a spool valve residing within a sleeve and screw means acting between the spool valve and sleeve whereby rotation of an operating shaft which is rotatively connected to the spool valve causes axial shifting of the spool valve relative to the sleeve.

Another object of the present invention is to provide a fluid controller which has a low slippage and a low leakage built thereinto.

Another object of the present invention is to provide a fluid controller of a design which permits an open or closed center hydraulic source with either open or closed center cylinder ports.

Another object of the present invention is to provide a controller which includes an internal gear set with a very low leakage along the two faces of the gear set.

Other objects and a fuller understanding of this invention may be had by referring to the following description and claims, taken in conjunction with the accompanying drawings, in which:

FIGURE 1 is an axial section of the hydraulic controller of the present invention;

FIGURE 2 is a view taken generally along the line 2—2 of FIGURE 1;

FIGURE 9 is an exploded isometric view of a portion of the controller shown in FIGURE 1;

FIGURE 10 is a fragmentary view of a portion of the controller taken at a position angularly moved from that shown in FIGURE 1;

FIGURE 11 is a fragmentary view of a portion of the controller demonstrating a closed center hydraulic pressure source; and FIGURE 12 is a view of the controller taken at a position angularly moved from that shown in FIGURE 1.

Figure 6:
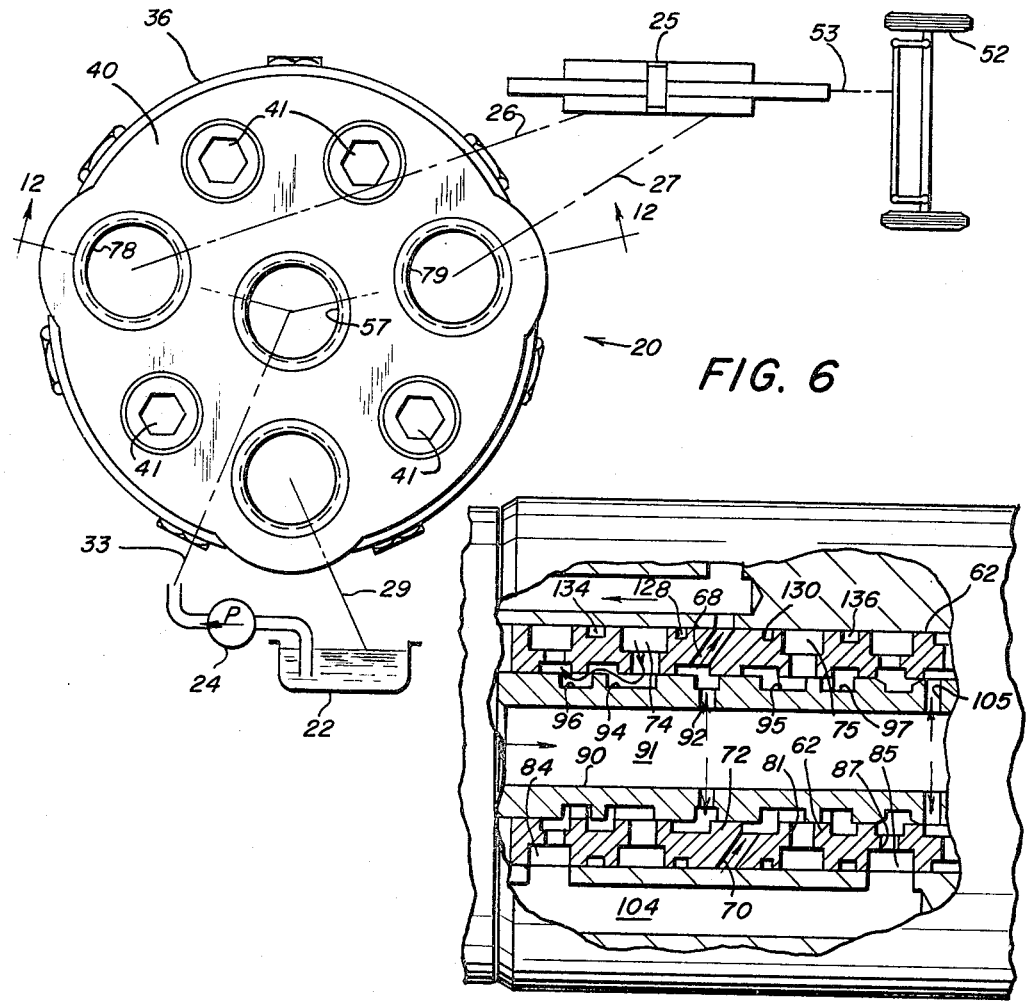
FIGURE 6 is a view taken generally along the line 6—6 of FIGURE 1 with a schematic of the hydraulic circuit.

The present invention, which relates in general to a hydraulic controller, has particular utility as a controller for a hydrostatic power steering system. The general or schematic arrangement of the power steering system is best seen by referring to FIGURE 6 which shows the controller 20, a source of hydraulic fluid 22, a pump 24, and a work cylinder 25. As seen in FIGURE 6, the fluid connections between the various elements of the hydrostatic steering system having been shown schematically by means of dot-dash lines. Fluid connection between the opposite ends of the work cylinder 25 and the fluid controller are represented by lines 26 and 27, reference numeral 29 represents the fluid line from the controller to the fluid source 22, and reference numeral 33 represents the fluid connection between the power pump 24 and the controller 20. The work cylinder 25 is adapted to be mechanically connected to the wheels 52 of the vehicle to be steered by conventional linkage mechanism illustrated here by dot-dash line 53, and upon movement of the piston in the work cylinder in one direction, the wheels are appropriately turned in a given direction and movement of the piston in the work cylinder in the opposite direction causes the wheels of the vehicle to be turned in the opposite direction. The fluid controller 20 is normally positioned in a neutral position (FIGURE 1) and is capable of being moved in either of two opposed directions upon a given signal. This given signal is, in the particular embodiment shown herein, transmitted by the operator of the vehicle by means of a steering wheel which will be described more fully hereinafter. In the event the operator desires to turn in one direction, the steering wheel is so turned, which moves the controller from a neutral position in one direction which causes fluid under pressure to travel from the pump 24 through the controller and to an appropriate end of the work cylinder 25 to turn the vehicle wheels in the desired direction. When the wheels have turned a distance indicated by the input signal, the controller shuts off the pressure from the power pump 24 to the work cylinder 25. If it be desired by the operator of the vehicle to turn the wheels in the opposite direction, the steering wheel is turned in the opposite direction, thereby moving the controller in an opposite direction from the above referred to neutral position which appropriately directs fluid under pressure from the pump 24 to the other end of the work cylinder 25 thereby turning the wheels of the vehicle in the opposite direction. This general discussion of the operation of the hydrostatic power steering system will be amplified by a detailed discussion of the structure, operation and result thereof and particularly that of the controller 20.

Referring specifically to the fluid controller 20, this device comprises a housing 30 having first and second end portions 31 and 32 respectively and the housing 30 is made up of several components which will be briefly enumerated. The housing in general includes what may be referred to as a valve housing 34, a body sleeve 36 which surrounds at least a portion of the valve housing 34, an internal-external gear pilot 38, and an end cover 40. The housing 30 has wall means therein which define an axial bore 35 in the housing which extends from the right or first end portion 31 as seen in FIGURE 1 to the second end portion 32, and this bore terminates at a point within the axial extent of the gear pilot 38.

An internal-external gear set is located in the second end portion of the housing, and this gear set includes a fixedly mounted internally toothed stator 37 which has its axis co-axial with the axis of the bore 35. The stator member is held in fixed position by means of bolts 41, specifically four in number, which extend (FIGURE 6) through the end cover 40, stator 37, and into the valve housing 34. The stator 37 in this particular embodiment is provided with seven teeth or lobes 42 which serve to define seven chambers which have been identified by the letters A, B, C, D, E, F, and G. Located within the stator 37 is an externally-toothed rotor 39 which is adapted for rotary and orbital movement with respect to the stator. The rotor 39 in this embodiment is provided with six teeth 50, this being one less tooth than the stator 37. The teeth of the rotor, upon rotational and orbital movement of the rotor, are adapted to alternately move into the spaces between the teeth on the stator and thereby cause the chambers A through G to go through alternately contracting and expanding cycles whereby fluid contained therein is expelled from and received into the chambers. The rotor and stator are located between the end cover 40 and a spacer 51, which spacer is located between the left end of the valve housing 34, as seen in FIGURE 1, and the rotor and stator. The housing, and more particularly that portion of the housing which is identified as the valve housing 34, is provided with a plurality of ports, specifically seven in number, identified by the reference numerals 43 through 49 which provide for fluid communication at their one end with the spaces between the stator teeth 42 (chambers A through G) and these ports at their other end extend to the bore 35 of the housing and terminate, circumferentially at equidistant, circumferentially spaced positions.

Figure 3:
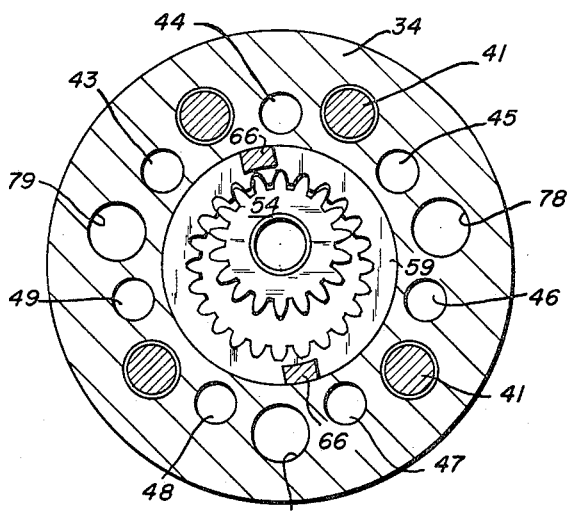
FIGURE 3 is a view taken generally along the line 3—3 of FIGURE 1.

An external drive gear in the nature of a pinion gear 54 is fixedly secured to the rotor 39 by means of a stub shaft 55 and keys 56 whereby this pinion is adapted to rotate and orbit in unison with the rotor 39. The pinion 54 and stub shaft 55 are provided with an axial opening 58 therethrough as is the rotor 39. This opening through the stub shaft and pinion and rotor 39 is adapted to be at all times in fluid communication with a pressure fluid inlet 57 in the end cover 40. An internal drive gear 59 in the nature of a ring gear surrounds the pinion gear 54 and is co-axial with the bore 35. A commutator sleeve 62 which serves at time as an actuator is positioned in the bore 35 and is adapted for rotation about an axis which lies on the axis of the bore 35. The commutator sleeve has an outer surface 64 which is adjacent the bore wall 35 and has an inner surface 63. It will be noted at this point and will be discussed in more detail hereinafter, that although the commutator sleeve 62 is capable of rotating under some circumstances, there is no control valving accomplished by this rotation. The ring gear 59 and the commutator sleeve 62 are connected together as indicated at 66 in FIGURES 1 and 3 by means of a protruding member on the ring gear residing in a slot in the commutator sleeve.

Figure 4:
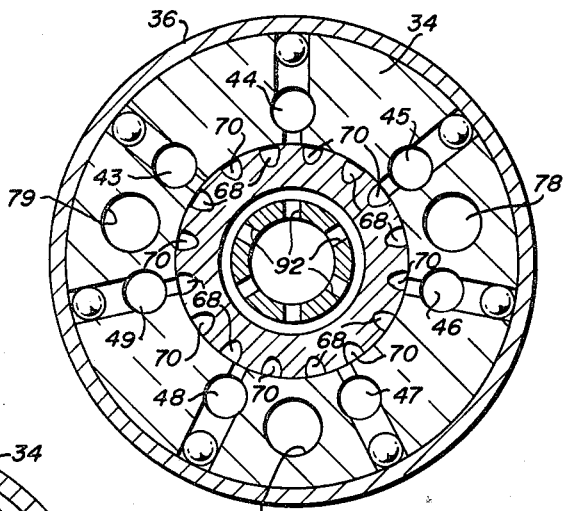
FIGURE 4 is a view taken generally along the line 4—4 of FIGURE 1.

A first plurality of openings are provided in the commutator sleeve 62 and these openings have been identified by the reference numeral 68, there being specifically eight in number and these openings are best seen in FIGURES 1 and 4. These openings extend from the inner surface 63 of the sleeve and are equally and circumferentially spaced from each other. A second plurality of openings 70 (eight in number) also extend from the inner surface of the sleeve and are equally and circumferentially spaced from each other. The second plurality of openings at their point of origin on the inner surface of the sleeve are axially spaced from the first plurality of openings and are separated therefrom by what has been referred to as a supply land 72. The first and second plurality of openings as will be noted particularly from FIGURE 1, extend through the commutator sleeve at opposite angles and the point where they terminate on the outer surface 64 of the sleeve they are located in axial alignment with each other and they also are located in axial alignment with the ports 43 through 49 which terminate at the bore 35. Also as will be seen in FIGURE 4, the openings of the first and second plurality are alternately positioned with respect to each other.

First and second annular work cylinder grooves 74 and 75 are provided on the outer surface of the commutator sleeve and are positioned respectively on opposite sides of the first and second plurality of openings 68 and 70 in the sleeve. First and second work cylinder passages 78 and 79 are provided in the housing (and as will be best seen in FIGURE 12). The passage 78 is connected at one end to the first work cylinder groove and the passage 79 is connected at one end to the second work cylinder groove. At their other ends the passages 78 and 79 are adapted to be connected in fluid conducting relationship to the first and second end portions of the work cylinder 25 by way of the conduits 26 and 27 shown in FIGURE 6.

A plurality of circumferentially spaced work cylinder groove openings 81 extend from the first and second annular work cylinder grooves 74 and 75 to provide for fluid communication from these grooves to the inner surface 63 of the commutator sleeve. First and second annular return grooves 84 and 85 respectively are also located on the outer surface of the commutator sleeve and are respectively located on opposite sides of the first and second plurality of openings 68 and 70 and are also located axially outside of the first and second work cylinder grooves 74 and 75. A plurality of circumferentially spaced return groove openings 87 provide for fluid communication from the return grooves 84 and 85 to the inner surface 63 of the commutator sleeve.

A valve spool 90 is positioned within the commutator sleeve and is adapted for limited axial movement in two directions relative to the position shown in FIGURE 1 which is the neutral position of the controller. The valve spool is shown shifted axially to the left in FIGURE 7 and the valve spool is shown as shifted axially to the right in FIGURE 8. The construction of the valve spool 90 is such that it is hollow throughout its entire axial length to provide a passage 91. The valve spool is provided with a plurality of what has been referred to as feeder openings 92 which are located at an intermediate position of the spool and provide for fluid communication from the passage 91 to the external surface of the spool. In the neutral position of the controller and the spool, these feeder openings are dead-ended by the supply land 72 which is on the inner surface of the commutator sleeve. The passage 91 in the hollow valve spool is connected to the pressure pump 24 by means of the hollow construction of the rotor 39 and the pinion gear 54 and stub shaft 55 as well as the pressure inlet 57, in the end cover 40, and the fluid conduit 33. The outer surface of the valve spool is provided with two grooves 94 and 95 which cooperate with the first and second grooves 74 and 75 on the commutator sleeve and two grooves 96 and 97 on the valve spool cooperate with the return grooves 84 and 85 on the commutator sleeve. To provide for the circulation of pressurized fluid in the neutral position of the controller, a neutral groove 100 is provided on the commutator sleeve as well as a cooperating groove 101 on the valve spool. A return passage 104 is provided in the housing and more specifically in the valve housing 34 and is connected at one portion to the annular return grooves 84 and 85 and the other portion or other end of the return groove is connected in fluid communication with the fluid source or sump 22 by way of the fluid conduit 29 and openings in the end cover 40, stator 37, and spacer 51 which have not been numbered. A plurality of what have been referred to as neutral position openings 105 are provided in the right end of the valve spool as seen in FIGURE 1 and provide for fluid communication between the passage 91 in the hollow valve spool and the neutral groove 100 on the inner surface of the commutator sleeve. The purpose of this construction is best seen in FIGURE 1 and in the neutral position of the controller, pressurized fluid from the pump 24 is simply re-circulated through the controller by way of the passage 91, the openings 105, grooves 100 and 101 and the second return groove 85 to the return passage 104 and to the sump 22.

The right or first end portion of the valve spool is provided with first and second helical grooves 107 and 108 and positioned adjacent these grooves and in the right or first end portion of the commutator sleeve are first and second ball retaining openings 110 and 111. First and second balls 113 and 114 are adapted to reside in the first and second ball retaining opening respectively with a portion of each of these balls being located in the first and second helical grooves 107 and 108 respectively. The balls are maintained in the position shown in FIGURE 1 by means of a retaining sleeve 116 and the retaining sleeve is in turn maintained within a counter bore in the valve housing 34.

Figure 5:
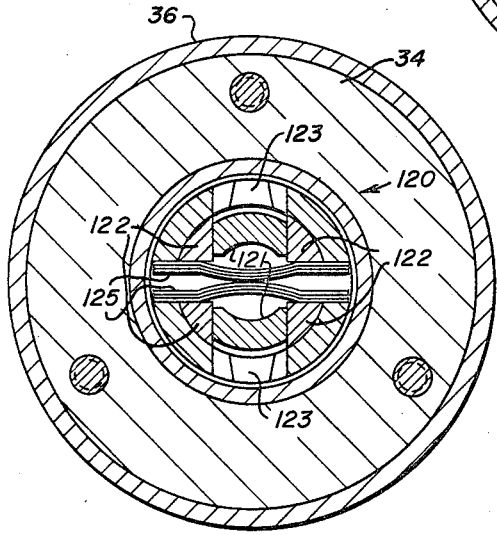
FIGURE 5 is a view taken generally along the line 5—5 of FIGURE 1.

The housing 30 in addition to the other elements recited hereinabove, also includes a portion which is specifically identified as a shaft housing 115 which serves to house and by means of bearings 117 rotatively mount a coupling shaft 118 which may be variously referred to as a drive or operating shaft. The right end of the coupling shaft as seen in FIGURE 1 is adapted to be connected to a steering wheel (not shown) and the left end of the coupling shaft is provided with a connection means indicated generally in FIGURE 5 by the reference numeral 120, for connecting the operating shaft to the right end of the valve spool 90. This connection as will be more specifically described hereinafter, is such that the valve spool 90 and the coupling shaft 118 rotate together or in common with each other and there is no relative rotational movement therebetween. The connection is also such that there is permitted relative axial movement between the valve spool 90 and the coupling shaft 118. The common rotation between these two members can best be appreciated from FIGURE 5 wherein the portions 121 are a part of the valve spool 90 and the portions 122 are part of the operating shaft. It will therefore be appreciated that rotation of the operating shaft must cause corresponding rotation of the valve spool. The portions identified by the reference numeral 123 in FIGURE 5 are portions of the right end of the commutator sleeve 62. It will thus be seen that this construction permits some small relative rotative movement between the commutator sleeve on the one hand and the valve spool and coupling shaft on the other hand. Two leaf springs 125 act between the commutator sleeve and the rotatively combined coupling shaft and valve spool 90 and tend to keep these elements spaced and in the positions shown. The leaf springs 125 therefore tend to cause the commutator sleeve to rotate with the coupling shaft and valve spool when they are rotated. Rotation of the coupling shaft in one rotational direction also causes rotation of the valve spool as hereinabove described and assuming sufficient resistance to prevent rotation of the commutator sleeve, the force of the leaf springs 125 will be overcome and the action of the balls 113 and 114 in the helical grooves 107 and 108 will cause the valve spool to shift axially in a direction which is dependent upon the direction of rotation of the coupling shaft 118. Turning of the coupling shaft in the opposite direction will cause a corresponding shifting of the valve spool in the opposite axial direction.

The operation of the hydrostatic power steering system which utilizes the controller which has been described in detail hereinabove will be set forth as follows. Assuming it be desired to turn the vehicle to the right, the operator of the system would rotate the drive shaft 118 in a clockwise direction as viewed from the right end of FIGURE 1. Referring specifically to FIGURES 1 through 5 and assuming the vehicle wheels are resting on the ground, the commutator sleeve 62 would be maintained from rotating because of its connection with the rotor 39 which is maintained from rotation. As a result, rotation of the drive shaft causes rotation of the valve spool 90 and upon the leaf springs 125 flexing a small amount, the balls 113 and 114 acting in the helical grooves 107 and 108 cause the spool 90 to shift axially to the left as viewed in FIGURE 1, to assume the position of FIGURE 7. The balls and the grooves may be referred to as inclined plane actuator means. This movement shuts off the return of the hydraulic fluid from pump 24 to the sump by way of the grooves 100 and 101, and causes the same fluid to flow through feeder openings 92 in the spool (which were previously dead ended by the supply land 72) and through openings 68 in the commutator sleeve and into those ports 43 through 49 which coincide, at least in part, with the corresponding openings 68. Referring specifically to FIGURES 1, 2 and 4 three of the first plurality of openings 68 are in communication with the ports 43, 49, 48, and none of the other openings 68 are in communication with any of the other ports. This causes high pressure fluid to be transmitted through ports 43, 48, 49, to chambers A, G and F (FIGURE 2) which causes the rotor 39 to rotate in a counter-clockwise direction, as viewed in the direction of FIGURE 2. This causes fluid under pressure to be expelled from chambers C, D, E through ports 45, 46, 47, into those openings of the second plurality 70, which are in communication therewith and from there into the second cylinder groove 95 on the valve spool and through the openings 81 into the second work cylinder groove 75 on the spool and from there through passage 79 and fluid connection 27 to the cylinder 25. Movement of the piston within the cylinder 25 causes fluid to be expelled from the opposite end of the cylinder which is returned by way of fluid connection 26 and first work cylinder passage 78 into the first work cylinder groove 74 through the openings 81 associated therewith into the grooves 94 and 96 on the valve spool and into the first return groove 84 by way of the openings 87 associated therewith, and from there to the sump by way of the return passage 104.

The counter-clockwise direction of rotation of the rotor 39 also causes the pinion 54 to rotate in a counter-clockwise direction and the ring gear 59 to rotate in a clockwise direction. It should be kept in mind that when the rotor rotates counter-clockwise, its axis orbits relative to the axis of the stator in a clockwise direction. Since the ring gear 59 is connected to the commutator sleeve 62 at 66, the commutator sleeve also rotates in a clockwise direction and assuming that the drive shaft 118 has not been turned further, in a clockwise direction, the balls 113 and 114 by way of the helical grooves 107 and 108 cause the valve spool 90 to shift to the right back to the neutral position of FIGURE 1. This construction comprises a follow-up mechanism to move the spool back to neutral.

Figure 8:
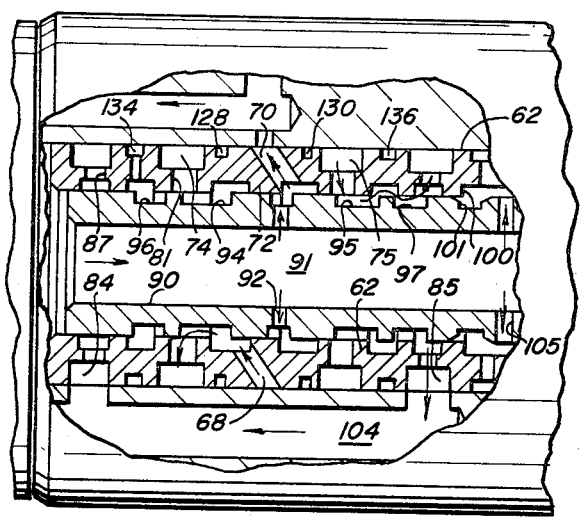
FIGURE 8 is a view similar to FIGURE 7, but showing the valve spool shifted to the right.

If it is desired to turn the vehicle wheels in the opposite direction the operator of the device turns the drive shaft 118 in the opposite or counter-clockwise direction which causes a shifting of the valve spool to the right or to that position shown in FIGURE 8. This causes fluid under pressure to be transmitted through the second plurality of openings 70 which coincide with particular ports, specifically 45, 46, 47 (FIGURE 4). This causes fluid under pressure to be transmitted to chambers C, D, and E in the gear set and subsequent rotation of the rotor in a clockwise direction. Fluid under pressure is expelled from chambers A, F, G, through ports 43, 48, 49, into the opposite end of the work cylinder 25 by way of the first work cylinder groove 74 and associated passages. Movement of the work cylinder piston causes fluid being expelled from the work cylinder to pass to the sump by way of the second work cylinder groove 75 and the second return groove 85. Rotation of the rotor and pinion in a clockwise direction causes rotation of the sleeve 62 in a counter-clockwise direction and shifting of the valve spool 90 to the left back to the neutral position of FIGURE 1.

*Description of the operation of the device upon failure of the power pump 24*

Figure 7:
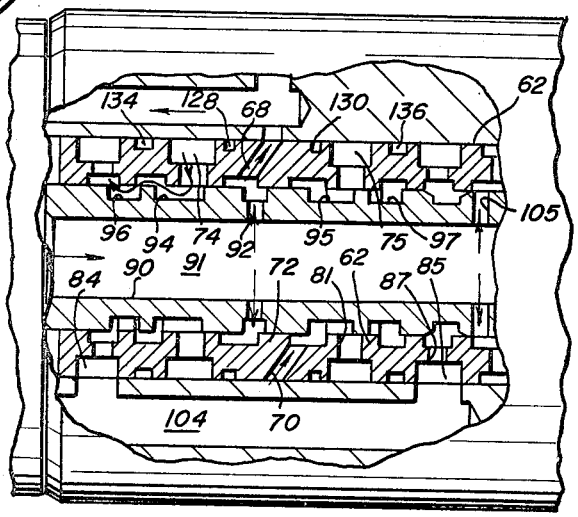
FIGURE 7 is a fragmentary view of a portion of the device shown in FIGURE 1 and showing the valve spool shifted to the left.

The design of the controller of the present invention enables the power steering system to function should the hydraulic pressure be discontinued because of a malfunctioning of the pump 24. In this event, by turning the steering wheel and the drive shaft 118, the controller 20 functions as a pump. For the sake of example, if the power pump 24 fails and it be desired to turn the wheels of the vehicle to the right, it is only necessary to rotate the drive shaft in a clockwise direction to shift the valve spool to the left as shown in FIGURE 7 and the rotation of the rotor is caused by way of the sleeve 62, and gears 59 and 54. Rotation of the rotor in a counter-clockwise direction causes fluid to be expelled under pressure from chambers C, D and E which fluid passes to the proper side of the work cylinder by way of the second plurality of openings 70, grooves 95 and 75, passage 79, and fluid connection 27. Fluid from the outlet side of the work cylinder is returned to the passage 91 in the hollow valve spool by way of fluid connection 26, passage 78 and grooves 74, 94 and 84. Normally, under power operation, the return fluid from the work cylinder returns to the sump by way of return passage 104. However, with the rotor-stator acting as a pump, the fluid in the return passage 104 is at a higher pressure than the pressure within the hollow valve spool. Under these circumstances, the ball check valve 148 (FIGURE 1) is moved off of its seat because of the pressure in the return passage and this fluid travels to the bore of the hollow valve spool by way of passage 150 and opening 105 in the spool to provide a source of supply for operation of the controller. Under the operating conditions set forth above fluid is supplied to chambers A, F and G from passage 91 by way of openings 68 and ports 43, 48 and 49. With an opposite rotation of the drive shaft, for example in a counter-clockwise direction, the spool 90 shifts to the position of FIGURE 8 and the fluid return from the outlet side of the work cylinder 25 is ported to return passage 104 by way of cylinder groove 75 and return groove 85 and the fluid is also returned to the hollow bore of the valve spool by way of the ball check valve 148 and passage 150. In the manual operation of the device upon the failure of the power pump 24, it will of course require more manual effort on the part of the operator than upon power operation of the system, however, by this means it is possible to operate the system satisfactorily.

*Low slippage-leakage design*

The design of the present invention has built thereinto what may be referred to as low slippage and low leakage. These features result in a greatly improved performance of the system with regard to reduced hand wheel slippage. One of these features involves that structure which has already been described hereinabove and will best be appreciated from a review of FIGURES 1 and 2. It will be appreciated that various of the chambers A through G at particular rotational positions are higher pressure fluid chambers and it is desirable that the leakage from these chambers be maintained at a minimum. This is accomplished in the present design in that high pressure fluid from the pressure pump 24 is always ported into the controller 24 through the central portion of the rotor 39. As a result, with this portion of the gear set at, or close to the pressure in the chambers A through G, the side leakage or in other words that leakage along the face of the rotor facing the end cover 40 and along the face of the rotor facing the spacer 51 is practically cancelled.

The other feature of the design involves the prevention of leakage between the commutator and the low-pressure cylinder port. It should be kept in mind that the leakage which is of primary concern is that leakage on the downstream side of the gear set. In order to prevent this leakage, annular grooves 128 and 130 have been provided on the outer surface of the commutator sleeve on opposed sides of the first and second plurality of openings 68 and 70. Referring to FIGURE 8, it will be seen that the second work cylinder groove 75 is at low or return pressure merely porting the exhaust of work cylinder 25 back to the sump while at the same time the first plurality of openings 68 are porting high pressure fluid from the gear set to the other side of the work cylinder piston. As a result, if it were not for groove 130, there would be a large leakage between the second cylinder groove and the first plurality of openings which transmit the high pressure fluid. This groove 130 is at high pressure because it is connected by openings 131 to the feeder openings 92 when the valve spool is in this position. These openings 131 are quite small since there is practically no flow to the groove 130 (only the leakage flow) and as a result there is a negative leakage under some conditions or at the most a very small positive leakage under other operating conditions. The leakage groove 128 functions in exactly the same way when the opposite cylinder groove is under return pressure as in the condition of FIGURE 7. Fluid is supplied to groove 128 by way of openings 132.

The present construction also prevents leakage from the work cylinder groove 74 or 75 which is at high pressure to the return groove 84 or 85 which is adjacent thereto. For example, when the first work cylinder groove 74 is at high pressure there is a tendency for leakage from this groove to the adjacent return groove 84. To reduce this leakage there has been provided a leakage groove 134 between the cylinder groove 74 and return groove 84 and a leakage groove 136 is located between the cylinder groove 75 and the return groove 85. Openings 135 and 137 provide communication from these grooves to the inner surface of the commutator sleeve. It will be seen for example when the valve spool is shifted to the left (FIGURE 7), the groove 134 is opened to return or sump and the groove 136 is open to return or sump when the valve spool is shifted to the right (FIGURE 8). The grooves 134 and 136 are fed high pressure fluid from the power pump by way of passage 140 (FIGURE 10) which feeds small capillary-like openings 142 in flow control plug members 144 and 145. The openings 142 are of such a size to furnish the proper high pressure leakage to the grooves 134 and 136 without appreciable pressure drop but with a high enough resistance to flow to avoid a waste of hydraulic power. Where groove 134 or 136 is connected to sump, the passage 140 is connected to passage 91 by way of groove 151, opening 152 and opening 105.

The low leakage design which has been hereinabove described is applicable to hydraulic devices other than the specifically described hydraulic controller disclosed herein. It is applicable to hydraulic devices where no leakage is desired and generally relates to hydraulic devices which comprise relatively movable elements, for example, the relatively movable elements shown in FIGURE 1 and described as the sleeve which is movable and the valve body which is fixed. The leakage prevention design involves the interpositioning of an auxiliary groove between first and second grooves where it is desired that no leakage occur between the first and second groove. In accordance with the present teachings, fluid is fed to the auxiliary groove at a pressure equal to or approximating the pressure in the high pressure one of the first and second grooves, thus cancelling the pressure differential between the higher pressure groove and the auxiliary groove and hence cancelling leakage flow. The fluid will leak from the auxiliary groove to the lower pressure groove of the first and second grooves but the auxiliary groove is fed with fluid from a part of the circuit where leakage is unimportant. As herein disclosed, when the first and second grooves, between which no leakage is desired, are connected (for example by the movement of a valve spool), the flow from the auxiliary or leakage preventing groove will be limited by means such that the efficiency of the system does not drop appreciably. This particular design described has application for example in four-way fluid valve constructions.

The present design of the fluid controller is very advantageous in that it permits an open center hydraulic pressure source with cylinder ports either closed or open. It is also possible to have a closed center hydraulic source with cylinder ports either closed or open. Only minor modifications of the valve spool are necessary to change from open to closed center porting. FIGURE 11 is a fragmentary view which demonstrates a closed center hydraulic source. This figure shows a sleeve 154 and a spool 155. It is seen that fluid is prevented from circulating to the gear set and to the sump in the neutral position which is shown in FIGURE 11. The gear set as described herein acts as a servo mechanism as described in the power operation and will be claimed as such herein. The grooves and openings referred to in the spool and sleeve will sometimes be referred to as valve openings. The grooves 128, 130, 134 and 136 will also be referred to at times as high pressure grooves.

It will also be appreciated by those skilled in the art that the gears 54 and 59 provide a novel means of transmitting movement from the gear set to the sleeve when the same is acting as a motor and to the gear set from the shaft 118 and sleeve when the same is acting as a pump for example in the operation of the device when the pump 24 fails. When operating as a motor the gearing reduces the speed and as a pump gear set rotation is speeded up over that of the drive shaft 118.

It will thus be seen that a fluid controller has been provided which is particularly adapted to control hydraulic fluid flow in a power steering system, and this controller has built into the design a very low slippage and low leakage. The present controller design also conveniently provides for an open or closed center hydraulic source with either open or closed cylinder ports. The present design is conveniently actuated by the axial shifting of a valve spool in an appropriate direction depending upon the input signal whereupon fluid is properly directed to a work cylinder. The present design also conveniently incorporates therein structure which enables the device to be properly operated upon malfunctioning of the fluid pressure source.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A fluid controller comprising a housing having a bore therein, first and second cylinder passages in said housing communicating with said bore, a high pressure fluid passage in said housing communicating with said bore, a return passage in said housing communicating with said bore, an internal gear set mounted in said housing and including a stator and a rotor with chambers formed between the teeth of said rotor and stator, ports providing fluid communication between said chambers and circumferentially spaced positions at said bore, a rotatable commutator sleeve having valve openings and positioned in said bore, means connecting said sleeve to said rotor whereby rotation of one causes rotation of the other, a rotatable and axially movable valve spool having valve openings and positioned within said sleeve, an operating shaft, means connecting said spool to said operating shaft for common rotation therewith and permitting limited axial movement of said spool in two opposed directions relative to said sleeve and shaft, inclined plane means acting between said sleeve and spool whereby rotation of said spool causes axial movement of the same in a first direction from a neutral position which opens communication from said high pressure fluid passage by way of said valve openings in said spool and sleeve to said internal gear set and from said internal gear set by way of said valve openings in said spool and sleeve to one of said cylinder passages and communication is provided to said return passage by way of the other of said cylinder passages and said valve openings in said spool and sleeve, rotation of said rotor causing rotation of said sleeve and return movement of said spool to said neutral position by way of the action of said screw means.

2. A fluid controller comprising a housing having a bore therein, first and second cylinder passages in said housing communicating with said bore, a high pressure fluid passage in said housing communicating with said bore, a return passage in said housing communicating with said bore, an internal gear set mounted in said housing and including a stator and a rotor with chambers formed between the teeth and said rotor and stator, ports providing fluid communication between said chambers and circumferentially spaced positions at said bore, a rotatable commutator sleeve having valve openings and positioned in said bore, an internal drive gear carried by said sleeve, an external drive gear carried by said rotor and being in meshing engagement with said internal drive gear whereby rotation of one of said rotor and sleeve causes rotation of the other, a rotatable and axially movable valve spool having valve openings and positioned within said sleeve, an operating shaft, means connecting said spool to said operating shaft for common rotation therewith and permitting limited axial movement of said spool in two opposed directions relative to said sleeve and shaft, inclined plane means acting between said sleeve and spool whereby rotation of said spool causes axial movement of the same in a first direction from a neutral position which opens communication from said high pressure fluid passage by way of said valve openings in said spool and sleeve to said internal gear set and from said internal gear set by way of said valve openings in said spool and sleeve to one of said cylinder passages, and communication is provided to said return passage by way of the other of said cylinder passages and said valve openings in said spool and sleeve, rotation of said rotor causing rotation of said sleeve and return movement of said spool to said neutral position by way of the action of said screw means.

3. A fluid controller comprising a housing having a bore therein, first and second cylinder passages in said housing communicating with said bore, a high pressure fluid passage in said housing communicating said said bore, a return passage in said housing communicating with said bore, an internal gear set mounted in said housing and including a stator and a rotor with chambers formed between the teeth of said rotor and stator, ports providing fluid communication between said chambers and circumferentially spaced positions at said bore, a rotatable commutator sleeve having valve openings and positioned in said bore, an internal drive gear carried by said sleeve, an external drive gear carried by said rotor and being in meshing engagement with said internal drive gear whereby rotation of one of said rotor and sleeve causes rotation of the other, a rotatable and axially movable valve spool having valve openings and positioned within said sleeve, an operating shaft, means connecting said spool to said operating shaft for common rotation therewith and permitting limited axial movement of said spool in two opposed directions relative to said sleeve and shaft, helical groove means carried by said spool, ball means carried by said sleeve and partially residing in said groove means, whereby rotation of said spool causes axial movement of the same in a first direction from a neutral position which opens communication from said high pressure fluid passage by way of said valve openings in said spool and sleeve to said internal gear set and from said internal gear set by way of said valve openings in said spool and sleeve to one of said cylinder passages, and communication is provided to said return passage by way of the other of said cylinder passages and said valve openings in said spool and sleeve, rotation of said rotor causing rotation of said sleeve and return movement of said spool to said neutral position.

4. A fluid controller comprising a housing having a bore therein, first and second cylinder passages in said housing communicating with said bore, a high pressure fluid passage in said housing communicating with said bore, a return passage in said housing communicating with said bore, a follow-up mechanism mounted in said housing and including a fixed and a movable member with chambers formed by said fixed and movable members, ports providing fluid communication between said chambers and said bore, a rotatable first valve member having valve openings and positioned in said bore, means connecting said first valve member to said movable member of said follow-up mechanism, an axially movable second valve member having valve openings and positioned in said bore, an operating shaft, means connecting said second valve member to said operating shaft and permitting limited axial movement of said second valve member in two opposed directions relative to said shaft, means acting on said second valve member whereby rotation of said shaft causes axial movement of said second valve member in a first direction from a neutral position which opens communication from said high pressure fluid passage by way of said valve openings in said first and second valve members to said follow-up mechanism and from said follow-up mechanism by way of said valve openings in said first and second valve members to one of said cylinder passages, and communication is provided to said return passage by way of the other of said cylinder passages and said valve openings in said first and second valve members, rotation of said movable member causing rotation of said first valve member and return movement of said second valve member to said neutral position.

5. A fluid controller comprising a housing having an opening therein, first and second work passages in said housing communicating with said opening, a fluid supply passage in said housing communicating with said opening, a return passage in said housing communicating with said opening, a follow-up mechanism mounted in said housing and including a fixed and a movable member, ports providing fluid communication between said follow-up mechanism and said opening, a first valve member rotatably positioned in said opening and having valve openings, means rotatably connecting said first valve member to said follow-up mechanism, a second valve member movable axially relative to said first valve member and having valve openings, an operating shaft, means connecting said second valve member to said operating shaft, means acting on said second valve member whereby movement of said operating shaft causes said axial movement of said second valve member which opens communication from said fluid supply passage by way of said valve openings in said first and second valve members to said follow-up mechanism and from said follow-up mechanism by way of said valve openings in said first and second valve members to one of said work passages, and communication is provided to said return passage by way of the other of said work passages and said valve openings in said first and second valve members, said follow-up mechanism causing rotative movement of said first valve member which in turn causes return axial movement of said second valve member which closes communication from said fluid supply passage.

6. In a hydrostatic power steering system which includes a work cylinder, a hydraulic pump, and a hydraulic fluid source providing fluid to the pump, the provision of a hydraulic fluid controller; said controller comprising a housing having an axial bore therein, first and second cylinder passages in said housing and communicating at one end with said bore and at their other ends adapted to be connected to opposed end portions of the work cylinder, a high pressure fluid passage in said housing communicating at one end with said bore and at the other end adapted to be connected to the hydraulic pump, a return passage in said housing communicating at one end with said bore and at the other end adapted to be connected to the hydraulic fluid source, an internal gear set mounted in said housing and including a stator and a rotor with chambers formed between the teeth of said rotor and stator, ports providing fluid communication between said chambers and circumferentially spaced positions at said bore, a rotatable commutator sleeve having valve openings and positioned in said bore, means connecting said sleeve to said rotor whereby rotation of one causes rotation of the other, a rotatable and axially movable valve spool having valve openings and positioned within said sleeve, an operating shaft, means connecting said spool to said operating shaft for common rotation therewith and permitting limited axial movement of said spool in two opposed directions relative to said shaft, screw means acting between said sleeve and spool whereby rotation of said spool by way of said shaft causes axial movement of the same in a first direction from a neutral position which directs fluid from the pump by way of said valve openings in said spool and sleeve to said internal gear set and from said internal gear set by way of said valve openings in said spool and sleeve to one of said cylinder passages on to one end portion of the work cylinder and fluid returns from the other end portion of the work cylinder to said return passage by way of the other of said cylinder passages and said valve openings in said spool and sleeve, rotation of said rotor causing rotation of said sleeve and return movement of said spool to said neutral position by the action of said screw means.

7. In a hydrostatic power steering system which includes a work cylinder, a hydraulic pump, and a hydraulic fluid source providing fluid to the pump, the provision of a hydraulic fluid controller; said controller comprising a housing having a bore therein, first and second cylinder passages in said housing and communicating at one end with said bore and at their other ends adapted to be connected to opposed end portions of the work cylinder, a high pressure fluid passage in said housing communicating at one end with said bore and at the other end adapted to be connected to the hydraulic pump, a return passage in said housing communicating at one end with said bore and at the other end adapted to be connected to the hydraulic fluid source, a follow-up mechanism in said housing and including a fixed and a movable member with chambers formed thereby, ports providing fluid communication between said chambers and said bore, a rotatable commutator sleeve having valve openings and positioned in said bore, means connecting said sleeve to said movable member whereby rotation of one causes rotation of the other, a rotatable and axially movable valve spool having valve openings and positioned within said sleeve, an operating shaft, means connecting said spool to said operating shaft for common rotation therewith and permitting limited axial movement of said spool in two opposed directions, means acting between said sleeve and spool whereby rotation of said spool causes axial movement of the same in a first direction from a neutral position which directs fluid from the pump by way of said valve openings in said spool and sleeve to said follow-up mechanism and from said follow-up mechanism by way of said valve openings in said spool and sleeve to one of said cylinder passages on to one end portion of the work cylinder and fluid returns from the other end portion of the work cylinder to said return passage by way of the other of said cylinder passages and said valve openings in said spool and sleeve, rotation of said movable member causing rotation of said sleeve and axial return movement of said spool to said neutral position.

8. In a hydrostatic power steering system which includes a work cylinder, a hydraulic pump, and a hydraulic fluid source providing fluid to the pump, the provision of a hydraulic fluid controller; said controller comprising a housing having a bore therein, first and second cylinder passages in said housing and communicating at one end with said bore and at their other ends adapted to be connected to opposed end portions of the work cylinder, a high pressure fluid passage in said housing communicating at one end with said bore and at the other end adapted to be connected to the hydraulic pump, a return passage in said housing communicating at one end with said bore and at the other end adapted to be connected to the hydraulic fluid source, a follow-up mechanism in said housing and including a stator and a rotor with chambers formed between the teeth of said rotor and stator, ports providing fluid communication between said chambers and said bore, a rotatable commutator sleeve having valve openings and positioned in said bore, means connecting said sleeve to said rotor whereby rotation of one causes rotation of the other, a rotatable and axially movable valve spool having valve openings and positioned within said sleeve, an operating shaft, means connecting said spool to said operating shaft for common rotation therewith and permitting limited axial movement of said spool in two opposed directions, helical grooves on an end portion of said spool, balls carried by an end portion of said sleeve and residing in said grooves whereby rotation of said spool in one direction causes axial movement of the same in a first direction from a neutral position and rotation of said spool in another direction causes axial movement of the same in a second direction from a neutral position, rotation of said rotor causing rotation of said sleeve and return movement of said spool to said neutral position by way of said balls and helical grooves.

9. In a hydrostatic power steering system for vehicles which includes a source of hydraulic fluid, a power pump, and a work cylinder, the provision of a fluid controller; said fluid controller comprising a housing having first and second end portions, wall means defining an axial bore in said housing which bore extends from said first to said second end portion thereof, an internal-external gear set at said second end portion of said housing, said gear set including a fixedly mounted, internally toothed stator having an axis coaxial with the axis of said bore, an externally toothed rotor mounted within said stator for rotary and orbital movement with respect thereto, said stator having one more tooth than said rotor, a plurality of ports respectively communicating at one end with the spaces between said teeth on said stator and at the other end with said bore intermediate said first and second housing end portions at equidistant, circumferentially spaced positions, an external drive gear connected to said externally toothed rotor for common rotation and orbital movement therewith, wall means defining an opening extending generally axially through said rotor and external drive gear, an internal drive gear surrounding said external drive gear for rotation about an axis coaxial with the axis of said bore, a commutator sleeve having an inner and an outer surface with said outer surface being located adjacent said bore, means connecting said commutator sleeve and said internal drive gear together for common rotation therewith, a first and second plurality of openings extending through said sleeve, said first plurality of openings extending from the inner surface of said sleeve at equally and circumferentially spaced positions, said second plurality of openings extending from the inner surface of said sleeve at equally and circumferentially spaced positions which are axially spaced from the position of said first plurality of openings, said first and second plurality of openings at said inner surface of said sleeve being separated by a supply land, said first and second plurality of openings terminating at the outer surface of said sleeve in axial alignment with each other and with said ports opening into said bore, said openings of said first and second plurality being alternately positioned, first and second annular work cylinder grooves on said outer surface of said sleeve and located respectively on opposite sides of said first and second plurality of openings in said sleeve, first and second work cylinder passages in said housing and each connected at one end to said first and second work cylinder grooves respectively and at the other end adapted to be connected in fluid conducting relationship to first and second end portions of the work cylinder respectively, a plurality of circumferentially spaced work cylinder groove openings extending from said first and second annular work cylinder grooves to the inner surface of said sleeve, first and second annular return grooves on said outer surface of said sleeve and located respectively on opposite sides of said plurality of openings in said sleeve and outside said first and second work cylinder grooves, a plurality of circumferentially spaced return groove openings extending from said first and second annular return grooves to the inner surface of said sleeve, a hollow valve spool positioned within said commutator sleeve and adapted for limited axial movement in two directions relative to a neutral position, said hollow valve spool having a plurality of feeder openings extending therethrough and in neutral position being deadended by said supply land on said inner surface of said sleeve, means for connecting said hollow valve spool to the power pump through said opening in said rotor and said external drive gear, a groove on the outer surface of said valve spool for cooperation with each of said work cylinder and return grooves, a neutral groove on the inner surface of said sleeve and a cooperating neutral groove on the outer surface of said valve spool, a return passage in said housing connected to said return grooves and adapted to be connected to the source of hydraulic fluid at another portion thereof, a plurality of neutral position openings extending through said valve spool at one end thereof in communication with said neutral groove on said sleeve and in the neutral position of said spool connecting the interior of said valve spool to said return passage by way of said neutral grooves on said sleeve and on said spool and one of said return grooves, first and second helical grooves on said first end portion of said spool, first and second ball retaining openings in said first end portion of said sleeve, first and second balls residing respectively in said first and second ball retaining openings with a portion of said first and second balls being located in said first and second helical grooves, a retaining sleeve surrounding said balls to retain same in said ball retaining openings and said portion thereof in said helical grooves, a coupling shaft, means connecting one end of said coupling shaft to said valve spool whereby rotation of said coupling shaft in a first direction causes common rotation of said valve spool and said balls and helical grooves cause axial movement of said valve spool relative to said sleeve in a first direction and rotation of said coupling shaft in a second direction causes common rotation of said valve spool and said balls and helical grooves cause axial movement of said valve spool relative to said sleeve in a second direction, spring means acting between said valve spool and sleeve whereby slight relative rotation between said valve spool and sleeve is permitted, axial movement of said valve spool in said first direction causing fluid under pressure to pass through said first plurality of sleeve openings and into selected ones of said ports which coincide therewith and into the corresponding spaces between said stator teeth which causes rotation and orbiting of said rotor and expulsion of fluid from other spaces between stator teeth back through other of said ports and through said second plurality of sleeve openings which coincide therewith to one of said work cylinder grooves and one of said work cylinder passages to one end position of the work cylinder and fluid from the other end portion of the work cylinder returns through the other of said work cylinder passages and the other of said work cylinder grooves and one of said return grooves and associated openings to said return passage, rotation of said rotor causing axial movement of said spool in said second axial direction to said neutral position.

10. A fluid controller including in combination a housing, a gear set in said housing and comprising a fixed stator and a rotatable rotor, said stator having teeth forming a plurality of chambers, said housing forming fixed wall means adjacent the facing surfaces of said rotatable rotor along which leakage from said gear set may occur, valve means in said housing for porting pressure fluid from a pump to said gear set and from said gear set to a mechanism to be actuated, and passageway means for introducing pressure fluid from the pump to said valve means which passageway means includes an opening through the central portion of said rotor whereby pressure fluid from the pump is present at the juncture between the facing surfaces of said rotor and said fixed wall means to reduce the pressure differential between the central portion of said rotor and said chambers of said gear set and thereby reduce leakage.

11. A fluid controller including in combination a housing, a gear set in said housing and comprising a stator and a rotor, said stator and rotor forming a plurality of chambers, said housing including fixed wall means adjacent the side surfaces of said rotor along which leakage from said chambers may occur, valve means in said housing for porting pressure fluid from a pump to said gear set and from said gear set to a mechanism to be actuated, and passageway means for introducing pressure fluid from the pump to said valve means which passageway means includes an opening through the central portion of said rotor whereby pressure fluid from the pump is present at the juncture between the side surfaces of said rotor and said fixed wall means to reduce the pressure differential between the central portion of said rotor and said chambers of said gear set and thereby reduce leakage.

12. A fluid controller including in combination a housing, a gear set in said housing and comprising a fixed member and a movable member, said gear set having a plurality of chambers, said housing including fixed wall means adjacent the side surfaces of said movable member along which leakage from said chambers may occur, valve means in said housing for porting pressure fluid from a pump to said gear set and from said gear set to a mechanism to be actuated, and passageway means for introducing pressure fluid from the pump to said valve means which passageway means includes an opening through the central portion of said movable member whereby pressure fluid from the pump is present at the juncture between the side surfaces of said movable member and said fixed wall means to reduce leakage from said chambers.

13. A hydraulic fluid controller including in combination a housing having a bore therein, inlet means and outlet means in said housing providing for the introduction and exit of fluid, a valve sleeve in said bore, a valve spool residing in said sleeve, first and second spaced cylinder ports in said housing communicating with said bore, first and second spaced return ports in said housing communicating with said bore and located on opposite sides of both cylinder ports, said valve sleeve and spool adapted to appropriately direct fluid flow from said inlet means to said cylinder and return ports and to said outlet means, first and second high pressure grooves in the outer surface of said sleeve between said first and second cylinder ports, a high pressure groove in the outer surface of said sleeve between said first cylinder and first return port and between said second cylinder and second return port, means for feeding said high pressure grooves with high pressure fluid at a low volume rate from the inlet of said controller to reduce the leakage from said cylinder ports to said return ports which occurs at the juncture between the outer surface of said sleeve and said bore.

14. A fluid controller including in combination a housing having a bore therein, inlet means and outlet means in said housing providing for the introduction and exit of fluid, valve means in said bore, first and second spaced cylinder ports in said housing communicating with said bore, first and second spaced return ports in said housing communicating with said bore and located on opposite sides of both cylinder ports, said valve means adapted to appropriately direct fluid flow from said inlet means to said cylinder and return ports and to said outlet means, high pressure groove means in the outer surface of said valve means between said first and second cylinder ports and between said first cylinder and first return port and between said second cylinder and second return port, means for feeding said high pressure grooves with high pressure fluid at a low flow rate from the inlet of said controller to reduce the leakage from said cylinder ports to said return ports.

15. A fluid device including in combination an internally toothed stator, an externally toothed rotor, said rotor being mounted for rotary and orbital movement with respect to said stator, said rotor having fewer teeth than said stator, rotary and orbital movement of said rotor relative to said stator producing a plurality of alternately expanding and contracting chambers, operating shaft means, an internal drive gear connected to said operating shaft means for rotation therewith, an external drive gear located within said internal drive gear and meshing therewith and being connected to said rotor for common rotary and orbital movement therewith, said internal and external drive gear causing said rotor to rotate faster than said operating shaft means, and means for supplying fluid to and removing fluid from said chambers.

16. A fluid device including in combination an internally toothed stator, an externally toothed rotor, said rotor being mounted for rotary and orbital movement with respect to said stator, said rotor having fewer teeth than said stator, rotary and orbital movement of said rotor relative to said stator producing a plurality of alternately expanding and contracting chambers, operating shaft means, an internal drive gear connected to said operating shaft means for rotation therewith, an external drive gear located within said internal drive gear and meshing therewith and being connected to said rotor for common rotary and orbital movement therewith, and means for supplying fluid to and removing fluid from said chambers.

17. A hydraulic device including body and movable elements, wall means defining first and second grooves in said movable element at the interface between said body and movable elements between which no leakage is desired, said first groove being fed with a higher pressure fluid and said second groove being fed with a lower pressure fluid, wall means defining an auxiliary groove in said movable element between said first and second grooves, means for feeding said auxiliary groove with a pressure fluid substantially equal to the higher pressure fluid in said first groove thereby cancelling pressure differential between said first and auxiliary grooves and cancelling leakage flow from said first groove.

18. A fluid controller comprising a housing having a bore therein, first and second cylinder passages in said housing communicating with said bore, a high pressure fluid passage in said housing communicating with said bore, a return passage in said housing communicating with said bore, a follow-up mechanism mounted in said housing and including first and second relatively movable members with chambers formed therebetween, ports providing fluid communication between said chambers and said bore, rotatable and axially movable valve member means having valve openings and positioned in said bore, internal and external gear means rotatably connecting said valve member means to one of said relatively movable members of said follow-up mechanism, an operating shaft, connection means connecting said valve member means to said operating shaft and permitting rotation of said shaft and valve member means together and upon sufficient resistance to rotation of said valve member means being met said connection means permits axial movement of said valve member means from a neutral to an operating position and relative to said shaft, which opens communication from said high pressure fluid passage by way of said valve openings in said valve member means to said follow-up mechanism and from said follow-up mechanism by way of said valve openings in said valve member means to one of said cylinder passages, and communication is provided to said return passage by way of the other of said cylinder passages and said valve openings in said valve member means, rotation of said one of said relatively movable members of said follow-up mechanism causing rotation of said valve member means by way of said internal and external gears and axial return movement of said valve member means to said neutral position.

19. A fluid controller comprising a housing having a bore therein, first and second cylinder passages in said housing communicating with said bore, a high pressure fluid passage in said housing communicating with said bore, a return passage in said housing communicating with said bore, a follow-up mechanism mounted in said housing and including first and second relatively movable members with chambers formed therebetween, ports providing fluid communication between said chambers and said bore, rotatable and axially movable valve member means having valve openings and positioned in said bore, means rotatably connecting said valve member means to one of said relatively movable members of said follow-up mechanism, an operating shaft having an axially fixed axis which is coaxial with said housing bore, connection means connecting said valve member means to said operating shaft and permitting rotation of said shaft and valve member means together and upon sufficient resistance to rotation of said valve member means being met said connection means permits axial movement of said valve member means from a neutral to an operating position and relative to said shaft, which opens communication from said high pressure fluid passage by way of said valve openings in said valve member means to said follow-up mechanism and from said follow-up mechanism by way of said valve openings in said valve member means to one of said cylinder passages, and communication is provided to said return passage by way of the other of said cylinder passes and said valve openings in said valve member means, rotation of said one of said relatively movable members of said follow-up mechanism causing rotation of said valve member means by way of said means which rotatably connect said valve member means to said one of said relatively movable members of said follow-up mechanism and axial return movement of said valve member means to said neutral position.

20. A fluid controller comprising a housing having a bore therein, first and second cylinder passages in said housing communicating with said bore, a high pressure fluid passage in said housing communicating with said bore, a return passage in said housing communicating with said bore, a follow-up mechanism mounted in said housing and including first and second relatively rotatable members with chambers formed therebetween, ports providing fluid communication between said chambers and said bore, rotatable and axially movable valve and actuator means including valve openings and being positioned in said bore, internal and external gear means rotatably connecting said actuator means to one of said relatively rotatable members of said follow-up mechanism, an operating shaft, means acting between said operating shaft and said valve and actuator means whereby rotation of said shaft is capable of causing rotation of said actuator means and axial movement of said valve means, axial movement of said valve means to an operating position opening communication from said high pressure fluid passage by way of said valve openings to said follow-up mechanism and from said follow-up mechanism by way of said valve openings to one of said cylinder passages, and communication is provided to said return passage by way of the other of said cylinder passages and said valve openings, relative rotation of said rotatable members of said follow-up mechanism causing rotation of said actuator means by way of said internal and external gears and axial return movement of said valve member to a neutral position.

21. A fluid controller comprising a housing having a bore therein, first and second cylinder passages in said housing communicating with said bore, a high pressure fluid passage in said housing communicating with said bore, a return passage in said housing communicating with said bore, a follow-up mechanism mounted in said housing and including fixed and movable members with chambers formed between said members, ports providing fluid communication between said chambers and said bore, a valve member having valve openings and positioned in said bore, internal and external drive gear means operatively connecting said valve member to said movable member of said follow-up mechanism, said valve member having valve openings and positioned in said bore for axial motion, an operating shaft, means connecting said valve member to said operating shaft and permitting limited axial movement of said valve member in two opposed directions relative to said shaft, means acting on said valve member whereby rotation of shaft causes axial movement of said valve member in a first direction from a neutral position, which opens communication from said high pressure fluid passage by way of said valve openings to said follow-up mechanism and from said follow-up mechanism by way of said valve openings to one of said cylinder passages, and communication is provided to said return passage by way of the other of said cylinder passages and said valve openings.

22. A fluid controller including in combination a housing having a bore therein providing a bore wall surface, inlet means and outlet means in said housing providing for the introduction and exit of fluid, valve means in said bore having an outer peripheral surface, cylinder port means in said housing communicating with said bore, return port means in said housing communicating with said bore, said valve means adapted to appropriately direct fluid flow from said inlet means to said cylinder and return port means and to said outlet means, high pressure groove means in one of the surfaces of said valve means and said bore wall and between said cylinder port means and said return port means, and passage means in said housing having a flow restriction therein for feeding said high pressure groove means with high pressure fluid to reduce the leakage between said cylinder port means and said return port means.

23. A fluid controller as defined in claim 22, wherein said passage means comprises capillary-like openings.

24. A hydraulic device including first and second relatively movable elements, a rotatable shaft, means mechanically coupling said shaft to one of said elements so that rotation of said shaft mechanically causes relative movement of said elements, wall means defining first and second grooves at the interface between said first and second elements between which no leakage is desired, said first groove being fed with a higher pressure fluid and said second groove being fed with a lower pressure fluid, wall means defining an auxiliary groove between said first and second grooves, and passage means for feeding said auxiliary groove with a pressure fluid substantially equal to the high pressure fluid in said first groove thereby cancelling pressure differential between said first and auxiliary grooves and cancelling leakage flow from said first groove.

25. The hydraulic device as defined in claim 24 and including restriction means in said passage means for reducing the flow of pressure fluid through said passage means.

26. A fluid controller including in combination a housing having a bore therein, inlet and outlet means in said housing providing for the introducton and exit of fluid, valve means in said bore, a pair of spaced cylinder ports in said housing communicating with said bore, a pair of spaced return ports in said housing communicating with said bore, said valve means adapted to appropriately direct fluid flow from said inlet means to said cylinder and return ports and to said outlet means, at least one of said return ports being disposed outside of said cylinder ports, means forming a pair of high pressure grooves between said cylinder ports and at least one high pressure groove outside of said cylinder ports, and means for feeding said high pressure grooves with high pressure fluid at a low flow rate from the inlet of said controller to reduce the leakage from said cylinder ports to said return ports.

27. A fluid controller including in combination a housing having a bore wall providing a bore therein, inlet and outlet means in said housing providing for the introduction and exit of fluid, valve means rotatably carried in said bore and having an outer peripheral wall in sliding engagement with said bore wall, cylinder port means in said housing communicating with said bore, return port means in said housing communicating with said bore, a hypocycloidal gear set in said housing including a pair of toothed members in meshing engagement with one another, one of said toothed members being rotatable for moving relatively rotatably and orbitally with respect to the other toothed member for forming therebetween a succession of expanding and contracting chambers, passage means communicating said chambers with said bore and valve means adapted to appropriately direct fluid flow from said inlet means to said chambers, said cylinder and return port means and said outlet means, means connecting said valve means and one of said members of said gear set for joint rotation, high pressure groove means in one of said walls between said cylinder port means and said return port means, and passage means in said housing having a flow restriction therein for feeding said high pressure groove means with high pressure fluid to reduce the leakage between said cylinder port means and said return port means.

28. A fluid controller including in combination a housing having a bore therein providing a bore wall surface, inlet means and outlet means in said controller providing for the introduction and exit of fluid, valve means in said bore having an outer peripheral surface, cylinder port means in said housing communicating with said bore, return port means in said housing communicating with said bore, said valve means adapted to appropriately direct fluid flow from said inlet means to said cylinder and return port means and to said outlet means, high pressure groove means in one of the surfaces of said valve means and said bore wall and adjacent said cylinder port means, and passage means in said valve means for feeding said high pressure groove means with high pressure fluid to reduce the leakage from said cylinder port means.

29. A fluid controller including in combination a housing having a bore therein providing a bore wall surface, inlet means and outlet means in said controller providing for the introduction and exit of fluid, valve means in said bore having an outer peripheral surface, cylinder port means in said housing communicating with said bore, return port means in said housing communicating with said bore, said valve means adapted to appropriately direct fluid flow from said inlet means to said cylinder and return port means and to said outlet means, high pressure grooves in one of the surfaces of said valve means and said bore wall and at least one groove being between said cylinder port means and said return port means and at least one other groove being on the other side of said cylinder port means, and passage means in said housing and in said valve means for feeding said high pressure grooves with high pressure fluid to reduce the leakage from said cylinder port means.

30. A fluid controller for a pressurized fluid operated device comprising a housing having a pair of hypocycloidal gears, one of which is rotatable relative to the other to provide relative rotational and orbital movement and expanding and contracting chambers therebetween, means forming a bore in said housing, valve structure in said housing including an inlet for connection to a source of pressurized fluid, an outlet for return of fluid to the source, a pair of ports for connection to the pressurized fluid operated device and fluid passages communicating said bore with said chambers, said valve structure further comprising a rotatable valve member in said bore shiftable axially in opposite directions from a neutral position to a pair of operating positions, means for rotatably interconnecting said valve member and said rotatable gear, said valve structure being constructed and arranged so that axial movement of said valve member between said operating positions causes pressurized fluid to flow from said inlet to said outlet in opposite directions through said chambers and said ports to cause said rotatable gear to rotate in opposite directions, said valve member in the neutral position thereof blocking flow of fluid from said inlet to said chambers, a control shaft carried in said housing for rotation relative thereto and to said valve member, and means coupling said control shaft to said valve member for shifting said valve member axially from the neutral to the operating positions thereof upon rotation of said control shaft in opposite directions, the rotation of said rotatable gear causing rotation of said valve member in a direction tending to shift said valve member axially back to the neutral position thereof.

31. The fluid controller as defined in claim 30 wherein said interconnecting means between said valve member and said rotatable gear prevents lost rotatable motion therebetween.

32. The fluid controller as defined in claim 30 wherein said coupling means comprises means providing for joint rotation and limited relative rotation of said control shaft and said valve member.

33. The fluid controller as defined in claim 30 wherein said coupling means comprises biasing means tending to rotate said valve member relative to said control shaft for shifting the valve member axially to the neutral position thereof.

34. The fluid controller as defined in claim 30 wherein said coupling means comprises means forming cooperating faces on said control shaft and on said valve member, and means providing in said faces a helical groove and a ball riding in said groove for imparting axial shifting of said valve member upon rotation of said control shaft relative thereto.

References Cited

UNITED STATES PATENTS

| | | | |
|---|---|---|---|
| 2,821,171 | 1/1958 | Charlson | 91—56 |
| 2,984,215 | 5/1961 | Charlson | 60—52 |
| 3,215,043 | 11/1965 | Huber | 91—56 |
| 3,246,472 | 4/1966 | Kries | 60—52 |
| 3,059,717 | 10/1962 | Moyer | 180—79.2 |

EDGAR W. GEOGHEGAN, *Primary Examiner.*

MARTIN P. SCHWADRON, *Examiner.*

P. T. COBRIN, *Assistant Examiner.*